United States Patent

[11] 3,554,309

| [72] | Inventor | Lucas L. Abercrombie<br>6333 Cedar St., Huntington Park, Calif. 90255 |
|---|---|---|
| [21] | Appl. No. | 766,493 |
| [22] | Filed | Oct. 10, 1968 |
| [45] | Patented | Jan 12, 1971 |

[54] POWER-OPERATED LOAD TRANSPORTING DEVICE
18 Claims, 4 Drawing Figs.

[52] U.S. Cl. .................................................. 180/8,
280/5.28
[51] Int. Cl. ................................................. B62b 5/02
[50] Field of Search ............................................ 180/8, 8.01;
280/5.28, 5.3, 5.2

[56] References Cited
UNITED STATES PATENTS
| 3,049,364 | 8/1962 | Clay | 280/5.28X |
| 3,215,446 | 11/1965 | Thackrey | 280/5.3X |
| 3,269,478 | 8/1966 | Joslyn | 280/5.3X |
| 3,417,831 | 12/1968 | Lake | 180/8(.01) |
| 3,438,641 | 4/1969 | Bradley | 180/8(.01)X |

Primary Examiner—Leo Friaglia
Attorney—Sellers and Brace

ABSTRACT: A power-operated load-transporting device operable up and down steps and along passageways. The device is equipped with front and rear supports selectively reciprocal to elevate the main frame between step treads and includes wheels for rolling movement of the device as well as means for arresting rolling movement. In a typical embodiment, the device comprises a hand truck for moving cargo but the invention principles are equally suitable for use on a wheelchair for the handicapped or incapacitated. All power components are energized from a battery.

PATENTED JAN 12 1971

3,554,309

INVENTOR
LUCAS L. ABERCROMBIE
BY
ATTORNEYS

POWER-OPERATED LOAD TRANSPORTING DEVICE

This invention relates to load-transporting devices and, more particularly, to an improved vehicle featuring power-operated means enabling the device to move up and down steps as well as along level passageways.

The transport of loads along steps, stairways and the like passages is attended by many difficulties and hazards as respects the equipment, the load itself, and the involved personnel. For example, there is frequent need for the movement of bulky articles between floors in buildings lacking elevator service. In such cases it is common practice to use manpower alone, although attempts have been made to provide power-operated devices capable of movement over steps. However, such devices as heretofore provided are subject to numerous shortcomings and disadvantages avoided by the present invention including lack of adequate capacity for heavier loads, essential safeguards, and flexibility and adaptability for different conditions.

To avoid these and other disadvantages of prior constructions, there is provided by this invention a rugged self-powered wheeled vehicle equally suitable for use along level and stepped passages. In an exemplary embodiment herein disclosed by way of illustration, the invention device is embodied in a hand truck for moving cargo such as boxes, furniture, home appliances and the like. The main frame pivotally supports a hand truck frame and includes reciprocal battery-powered supports selectively operable to transfer the main load between steps. The lower of the two main supports is equipped with carriage wheels for rolling movement of the device, and a storage battery supplies power to operate the hydraulic lifting and lowering mechanism. A brake for certain of the wheels sets automatically as an incident to initiating lowering of the load from one step to another. If desired, the device may be operated with self-actuating braking but without power when going down steps.

Accordingly, it is a primary object of the present invention to provide a unique load-transporting device having a self-contained power-operated means for operating the device along steps.

Another object of the invention is the provision of load-handling equipment having a wheel supported carriage and including means for selectively operating the supports in a manner to facilitate movement of the device between different levels.

Another object of the invention is the provision of a load-transporting device having a main frame provided with two sets of vertically movable, power-operated wheels arranged to be supported on the treads of steps and selectively operated in a manner to transfer the device proper between tread levels under the control of an operator and including self-actuating means for locking the device against rolling movement when descending one or more steps.

Another object of the invention is the provision of a device for negotiating steps with a load and including means for safely lowering the load along steps without need for power and including a provision for selectively using the weight of the carried load to set the wheel brakes.

These and other more specific objects will appear upon reading the following specifications and claims and upon considering in connection therewith the attached drawing to which they relate.

Referring now to the drawing in which a preferred embodiment of the invention is illustrated.

Figure 1:
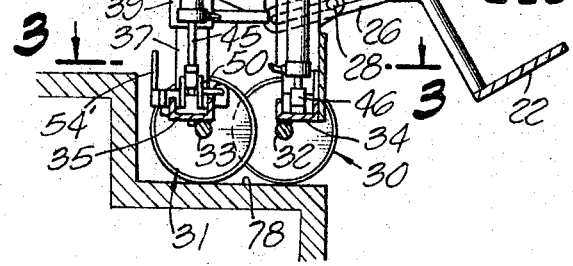
FIG. 1 is a side-elevational view partly in section showing one preferred embodiment of the invention supported on a set of steps.

Referring more particularly to FIG. 1, there is shown one preferred embodiment of the invention incorporated in a hand truck suitable for moving cargo from place to place and along steps. Device 10 includes a suitably fabricated main frame 11 including front and rear transverse frame units 12 and 13 rigidly interconnected by structural members 14 and 15. Lightweight structural members as aluminum alloy are preferably employed wherever feasible and these are brazed or welded together. Side plates 15 are preferably formed from plate stock, upper edge portion 16 preferably being inclined downwardly and forwardly and provided with a series of holes 17.

Adjustably and pivotally supported in holes 17 of the two side plates 15 is an inverted U-shaped cargo-supporting frame 18. As here shown, frame 18 is formed from tubular stock with its legs extending along the opposite sides of device 10 and interconnected at their upper ends by a handle 20 and at spaced intervals by crossmembers, not shown, and including a suitable ledge 22 engageable beneath the bottom of a box, the legs of an appliance, or other article to be transported on device 10. The sides of frame 10 are provided with a pair of brackets 23 formed with aligned holes for seating thumbscrews or pivot pins 24. As is made clear by FIG. 2, the spacing between the legs of frame 18 is greater than the spacing between the opposite sides of frame 14 with the result that frame 18 is free to pivot about pins 24. This pivotal movement may be limited, if so desired, by a slotted link 26 pivotally mounted to frame 18 at 27 and slideable crosswise of a clamping screw 28 carried by the forward frame member 12. Normally, thumbscrews 28 are loose and frame 18 is free to pivot about pins 24.

Main frame 11, as here shown by way of example, is supported on a front set of wheels 30 and a rear set of wheels 31 carried by respective axle 32, 33. Welded or otherwise fixed to the top of these axles are upturned channel members 34 and 35 having their ends welded to upright legs 36 and 37 having a close-sliding telescopic fit with tubular members 38 and 39 of the main frame. The extension and retraction of each set of wheels 30 and 31 is controlled by separate hydraulic cylinders 42 and 43 located in the midsection of main frame 11, the upper end of each cylinder being connected to a respective one of frames 12 and 13 and their piston rods 44 and 45 being respectively connected to the front and rear sets of wheels 31. It will also be understood that the two cylinders are offset at different elevations adequate to permit the two sets of wheels to be on different steps during one phase of their operation and such as to accommodate the maximum height of a step riser on which it is anticipated the device is to be employed.

Figure 2:
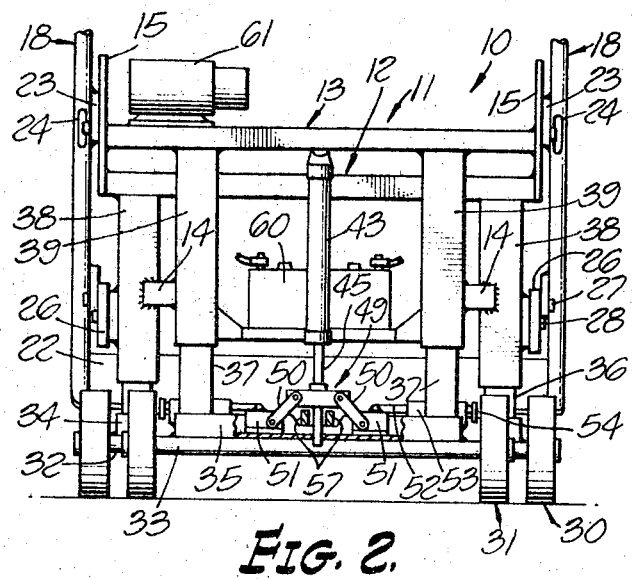
FIG. 2 is a fragmentary rear elevational view with the portions broken away and showing the wheel brake locked out of operation.
Figure 3:
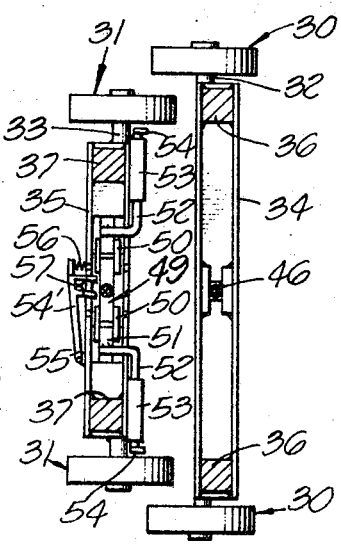
FIG. 3 is a fragmentary cross-sectional view taken along line 3–3 on FIG. 1.

The lower end of the piston rod of forward cylinder 42 is pivotally connected at 46 to channel member 34. The lower end of the piston rod of rear cylinder 43, however, is connected to the rear wheel carriage through a toggle mechanism 49 for setting the brakes of these wheels under certain conditions. This mechanism includes toggle links 50 pivotally connected at their remote ends to slide members 51 which are constrained to slide along the interior of channel member 35 and are welded, in turn, to members 52 which extends slidably through brackets 53 secured to the exterior of channel 35. The outer end of rods 52 support spot brake shoes 54 engageable with the inner faces of carriage wheels 31. As shown in FIGS. 2 and 3, the brakeshoes are retracted and toggle mechanism 49 is relaxed. As will be readily apparent from FIG. 2, the brakes are set by the extension of the toggle mechanism and the expansion of slide members 51 away from one another as piston rod 45 moves downwardly.

The brakes may be locked retracted and out of operation by lockout lever 54' pivoted to channel member 35 at 55 in the manner best shown in FIG. 3 and normally urged to their retracted position by a spring 56. Projecting forwardly from lockout lever 54 are a pair of forwardly and downwardly inclined cam fingers 57 arranged to straddle piston rod 45 of cylinder 43. Normally, fingers 57 are withdrawn from beneath the horizontal member of the toggle linkage. When it is desired to lock the brake in open position, the operator pivots lockout lever 54 clockwise as viewed in FIG. 3. It will be understood that fingers 57 rest against the lower edges of aligned notches in the side flanges of channel member 35 when in lockout position and therefore positively prevent setting the brakes despite the fact that pressurized fluid is being supplied to the upper end of cylinder 43.

Figure 4:
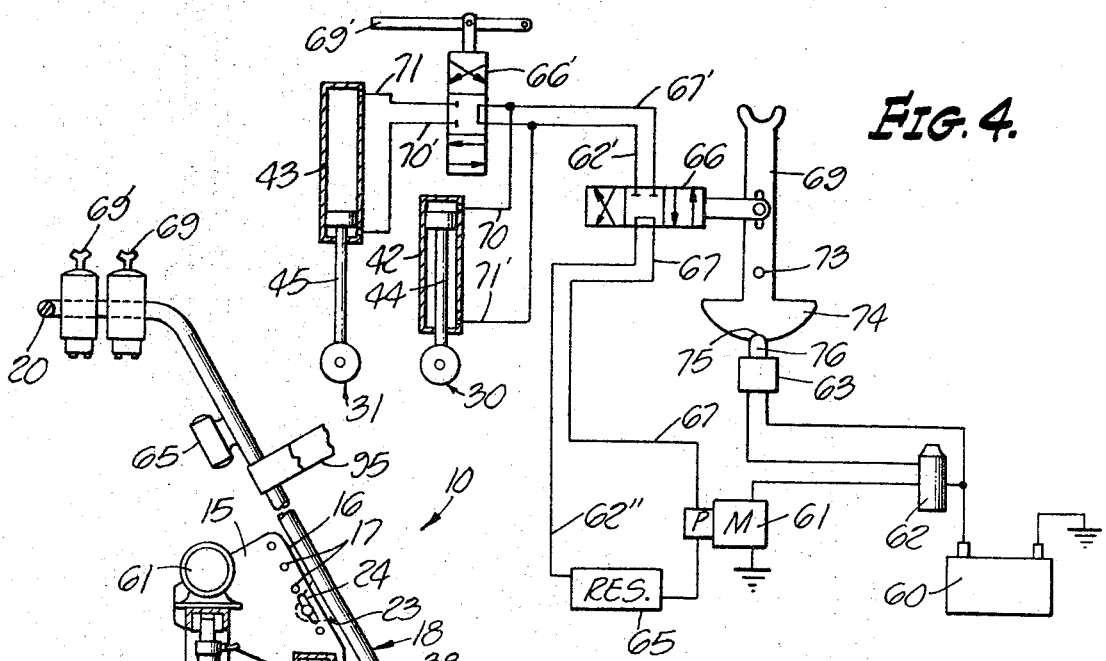
FIG. 4 is a schematic view of the power system and its control.

The means for supplying pressurized fluid to cylinders 42 and 43 will be best understood by reference to FIG. 4 showing a storage battery 60 connected to a motor pump unit 61 through a master switch 62, controlled by a microswitch 63. The fluid circuit for the pump includes a reservoir 65 connected to the pump inlet and its outlet being connected by conduits 67 and 67' to a pair of similar four-way valves 66, 66' of conventional design. It will be understood that valve 66 is a master control valve employed to control cycling of fluid during ascent of steps, whereas valve 66' reverses the fluid flow only between cylinders 42, 43 during descent of the steps. As shown in FIG. 4, valves 66, 66' are in their neutral positions, switch 63 is open and motor pump unit 61 is deactivated. If valve control levers 69, 69' are shifted counterclockwise, high-pressure fluid flows to the upper end of cylinder 42 via conduits 67' and conduit 70, and to the lower end of cylinder 43 via conduit 67', valve 66' and conduit 70'. At the same time, the fluid in the upper end of cylinder 43 returns to reservoir 65 via conduit 71, valve 66' and conduit 62', whereas fluid from the lower end of cylinder 42 returns via conduits 71' and 62'. If lever 69' is shifted to its full clockwise position, as it is when bringing a load down steps without the use of pressurized fluid supplied from the pump, valve 66 is returned to neutral and the fluid flow is then confined to a closed loop including the two cylinders and valve 66'. Accordingly, the load forces acting on the fluid in this closed loop causes the fluid to flow in first one direction and then the other as the front pair of wheels rides off successive ones of the steps.

It will be understood that control lever 69 is pivoted to a stationary member at 73 and includes an arcuate sector 74 having a notch 75 loosely seating operating button 76 of switch 63 when valve 66 is in its neutral position. However, if control lever 69 is moved in either direction from neutral, sector 74 depresses button 76 and closes switch 63 to close the master relay switch 62 and energize motor pump unit 61.

OPERATION

Let it be assumed that load carrying device 10 is being used to transport a refrigerator, not shown, from tread 78 of one step to the tread of the next lower step. The refrigerator would, of course, be supported on and resting against frame 18 with its feet positioned on member 22 and belt 95 tensioned about the refrigerator and holding it immovably in place against frame 18. Preferably, supporting frame member 18 is supported in an appropriate one of holes 17 so selected that the center of gravity of the load is generally overlying chassis frame 11. Normally, the operator would also wish to clamp thumb nuts 28 for tilt control link 26 to support the load in an appropriate inclined position relative to the chassis frame.

As was pointed out above, when going down steps, it is not necessary to energize motor pump unit 61 provided the operator places control lever 69 of four-way valve 66 in neutral position thereby trapping the fluid in the closed loop including cylinders 42, 43 and valve 66'. The latter valve is also shifted to its full clockwise position with the result that the fluid in cylinders 42, 43 can only flow between the ends of these cylinders via the conduits 70, 71, 70' and 71+.

Descent of the stairs is now commenced by grasping handle 20 of device 10 and rolling it forward on tread 78 until the forward pair of wheels 30 is fully forward of the tread edge while leaving the rear set of wheels 31 firmly seated thereon. The entire load is now supported on the rear wheels and acts to increase the pressure on the fluid trapped in the upper end of cylinder 43 thereby setting brakeshoes 54 against each of rear wheels 31 and causing the fluid to flow into the upper end of cylinder 42 via conduit 71, valve 66' and conduit 71' thereby forcing the piston in cylinder 42 downwardly until it strikes the tread of the next lower step thereby causing the fluid pressure in the cylinders to equalize. The weight is now carried equally by the front and rear sets of wheels with the result that the brakes are automatically relaxed and the operator may roll the device forward on the next supporting lower step until the front wheels 30 are again in position for lowering. The operator continues the descent of further steps in this manner while maintaining a firm rearward pull on handle 20. The brakes remain set on the rear wheels during the load-lowering to the next step but are automatically released as both sets of wheels assume a load-supporting position against the same or separate treads of the steps.

It will be understood that power can be used during the descent in which case valve 66' is shifted to its full counterclockwise position and the control lever of valve 66 is alternated between its two positions to walk the device and its load up the steps. Shifting valve control lever 69 to either position closes switch 63 to start the pump which now supplies pressurized fluid via conduits 67, 67', valve 66' and conduit 70' to the bottom of cylinder 43 and through conduit 70 to the top of cylinder 42. Return fluid flow takes place from the top of cylinder 43 via conduit 71, valve 66', and from cylinder 42 via conduit 71' and thence through conduit 62', valve 66 and conduit 62'' back to the reservoir and the pump inlet. Upon reversal of control lever 69 after the load has been lowered to the same step, the fluid flows in the reverse directions for self-apparent reasons. It will also be recognized that throughout the portion of the descent cycle in which there is no load on the front set of wheels, the high pressure condition prevailing in the upper end of cylinder 43 is effective to keep the brakes applied to wheels 31.

Ascent of the stairs is accomplished using power supplied from battery 60. Prior to starting the ascent operation, the operator takes the precaution of pressing the brake lockout lever 54 inwardly until fingers 57 are firmly positioned to lock toggle mechanism 49 open thereby assuring that the brakes are held disengaged throughout ascent of the stairs. No problem is involved since the operator is normally pulling backwardly and stepping up the steps thereby closing switch 63 and starting motor pump unit 61 to supply pressurized fluid through conduits 67, 67' past valves 66, 66' into conduits 70 into the upper end of cylinder 42 and through conduit 70' into the lower end of cylinder 42. Fluid thereby forced from the lower end of cylinder 42 passes through conduits 71', 62' and 62'' to the reservoir along with fluid from the upper end of cylinder 43 through conduits 71 and 62' and into reservoir 65 for recirculation through the pump. Forcing liquid into the top of cylinder 42 will be recognized as effective to raise the load until wheels 31 are flush with the next higher tread. The operator then shifts lever 69 to its clockwise position to reverse the flow of pressurized fluid to the top of cylinder 43 thereby continuing to elevate the load to the next higher step. The operator continues to reverse lever 69 in this manner for each step until the load reaches the top of the steps at which time valves 66, 66' can be placed in neutral.

While the particular power-operated load transporting device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other that as defined in the appended claims.

I claim:

1. A power-operated wheel-supported device for transporting a load up and down steps and along the ground or the like, said device having a main frame including means for supporting a load thereon, vertically movable first and second support means movably connected to said main frame including a plurality of wheels all cooperating to support said main frame both on and off steps, said first and second support means being spaced-apart longitudinally in the direction of travel of said device and effective to support said main frame in a stable rest position, and power operated means for selectively operating said first and second support means the height of at least one step riser at a time independently of the other of said support means.

2. A load-transporting device as defined in claim 1 characterized in that said plurality of wheels are operable to support said device for rolling movement along a level support and crosswise of a step tread.

3. A load-transporting device as defined in a claim 2 characterized in the provision of brake means for holding said device against rolling movement while being elevated between adjacent treads of steps.

4. A load-transporting device as defined in claim 3 characterized in the provision of means for setting said brake means automatically as an incident to the operation of said power operated means to elevate said main frame between step treads whereby the movement of said device is confined to a change in elevation.

5. A load-transporting device as defined in claim 1 characterized in that said vertically movable first and second support means includes a forward and a rearward set of wheels cooperable in one adjusted position thereof to support said main frame in a stable position.

6. A load-transporting device as defined in claim 5 characterized in that said forward and rearward sets of wheels partially overlap whereby both sets can rest on the same step tread in one operating position thereof.

7. A load-transporting device as defined in claim 5 characterized in that said forward set of wheels can rest on one step tread and said rearward set of wheels can rest on a different step tread in one operating position thereof.

8. A load-transporting device as defined in claim 1 characterized in the provision of means movably connected to said main frame for supporting a load while being moved from place to place on said load transporting device.

9. A load-transporting device as defined in claim 8 characterized in the provision of means pivotally connecting said main frame to said load-supporting means.

10. A load-transporting device as defined in claim 9 characterized in the provision of means for pivotally connecting said main frame and said load-supporting means together selectively in different positions for pivotal movement about a selected one of spaced parallel axes.

11. A load-transporting device as defined in claim 1 characterized in that said power-operated means comprises battery-powered fluid-driven means all mounted on said device and including manually-operated control means for activating and deactivating said power-operated means.

12. A load-transporting device as defined in claim 11 characterized in that said power-operated means comprises a separate fluid-operated cylinder means connected to a separate one of said first and second support means and including means for selectively extending and retracting either of said cylinder means.

13. In combination, a power-operated hand truck operable to climb up and down steps with cargo comprising a chassis frame equipped with front and rear sets of supporting wheels each equipped with independently operable pressurized fluid means for raising and lowering a respective set of said wheels by the height of a step riser, battery-driven means for selectively operating the pressurized fluid means for either set of wheels, and cargo-supporting means mounted on said chassis frame and having handle means positioned to be grasped in an operator's hand.

14. The combination defined in claim 13 characterized in the provision of control means for said pressurized fluid means and operable to control the raising and lowering of said front and rear sets of wheels relative to one another.

15. The combination defined in claim 13 characterized in that said cargo supporting means and said chassis frame include means adjustably securing the same in assembled position.

16. The combination defined in claim 13 characterized in that said cargo-supporting means and said chassis frame includes means for holding the same pivotally assembled to one another in a selected one of several positions.

17. The combination defined in claim 16 characterized in the provision of means for locking said cargo-supporting means against pivotal movement relative to said chassis frame.

18. The combination defined in claim 13 characterized in that said pressurized fluid means for each set of wheels comprises piston and cylinder motor means with common conduit means interconnecting upper and lower ends of one to the opposite ends of the other, whereby pressurized fluid supplied to said interconnections is effective to change the elevation of the set of wheels out of load bearing support with a step.